(12) United States Patent
Shaikh

(10) Patent No.: US 9,059,862 B2
(45) Date of Patent: Jun. 16, 2015

(54) EVOLVED PACKET CORE (EPC) NETWORK FAILURE PREVENTION

(75) Inventor: Imtiyaz Shaikh, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 139 days.

(21) Appl. No.: 13/432,324

(22) Filed: Mar. 28, 2012

(65) Prior Publication Data

US 2013/0242727 A1 Sep. 19, 2013

Related U.S. Application Data

(60) Provisional application No. 61/610,304, filed on Mar. 13, 2012.

(51) Int. Cl.
| | |
|---|---|
| *H04L 12/24* | (2006.01) |
| *H04L 12/815* | (2013.01) |
| *H04L 12/801* | (2013.01) |
| *H04L 12/803* | (2013.01) |

(52) U.S. Cl.
CPC ............... *H04L 12/24* (2013.01); *H04L 47/22* (2013.01); *H04L 47/122* (2013.01); *H04L 47/17* (2013.01); *H04L 47/12* (2013.01); *H04L 47/14* (2013.01)

(58) Field of Classification Search
USPC ........................................................ 370/230
See application file for complete search history.

(56) References Cited

U.S. PATENT DOCUMENTS

| | | | |
|---|---|---|---|
| 6,879,812 B2 | 4/2005 | Agrawal et al. | |
| 6,996,111 B1 | 2/2006 | Benayoun et al. | |
| 7,068,597 B1 * | 6/2006 | Fijolek et al. | 370/230 |
| 7,388,834 B2 * | 6/2008 | Naik et al. | 370/231 |
| 7,936,683 B2 | 5/2011 | Qiu et al. | |
| 8,027,265 B2 * | 9/2011 | Chu et al. | 370/252 |
| 8,422,373 B2 * | 4/2013 | Alanara | 370/235 |
| 8,428,610 B2 * | 4/2013 | Chowdhury et al. | 455/453 |
| 8,457,098 B2 * | 6/2013 | Yang et al. | 370/349 |
| 8,498,202 B2 | 7/2013 | Kanode et al. | |
| 8,503,992 B2 * | 8/2013 | Pehrsson et al. | 455/414.1 |
| 8,566,455 B1 * | 10/2013 | Zhao et al. | 709/227 |
| 2002/0077110 A1 * | 6/2002 | Ishikawa et al. | 455/452 |
| 2005/0144272 A1 | 6/2005 | Herzberg | |
| 2006/0007954 A1 | 1/2006 | Agrawal et al. | |
| 2007/0127420 A1 | 6/2007 | Tjandra | |
| 2008/0163007 A1 | 7/2008 | Shaeffer et al. | |
| 2008/0239944 A1 | 10/2008 | Golla et al. | |
| 2008/0261565 A1 | 10/2008 | Kunz et al. | |
| 2008/0263398 A1 | 10/2008 | Mori et al. | |
| 2009/0052322 A1 * | 2/2009 | Simonsson et al. | 370/235 |
| 2010/0149986 A1 * | 6/2010 | Johnson et al. | 370/235.1 |
| 2011/0202604 A1 * | 8/2011 | Craig et al. | 709/205 |

(Continued)

*Primary Examiner* — Ian N Moore
*Assistant Examiner* — Lakeram Jangbahadur

(57) ABSTRACT

A first device, provided in an evolved packet core (EPC) network, receives load information associated with a second device provided in the EPC network. The load information includes a load threshold associated with the second device. The first device also receives traffic to be provided to the second device, and determines whether providing the traffic to the second device will cause the second device to exceed the load threshold. The first device provides the traffic to the second device when providing the traffic to the second device will not cause the second device to exceed the load threshold. The first device reduces a quantity associated with the traffic, to create throttled traffic, and provides the throttled traffic to the second device, when providing the traffic to the second device will cause the second device to exceed the load threshold.

23 Claims, 12 Drawing Sheets

(56) References Cited

U.S. PATENT DOCUMENTS

| | | |
|---|---|---|
| 2011/0252123 A1* | 10/2011 | Sridhar et al. ............... 709/223 |
| 2011/0252477 A1* | 10/2011 | Sridhar et al. ................. 726/24 |
| 2011/0256856 A1* | 10/2011 | Rydneil et al. ............... 455/418 |
| 2012/0002541 A1* | 1/2012 | Lee et al. ..................... 370/230 |
| 2012/0044836 A1* | 2/2012 | Sivavakeesar et al. ........ 370/255 |
| 2012/0069733 A1* | 3/2012 | Ye et al. ....................... 370/221 |
| 2012/0140632 A1* | 6/2012 | Norp et al. .................... 370/235 |
| 2012/0173661 A1* | 7/2012 | Mahaffey et al. ............. 709/217 |
| 2012/0215851 A1* | 8/2012 | Wu et al. ...................... 709/205 |
| 2012/0269061 A1* | 10/2012 | Kekki ........................... 370/230 |
| 2012/0302244 A1* | 11/2012 | Sridhar et al. ................ 455/438 |
| 2013/0044596 A1* | 2/2013 | Zhi et al. ...................... 370/230 |
| 2013/0121282 A1* | 5/2013 | Liu ............................... 370/329 |
| 2013/0163424 A1* | 6/2013 | Goerke et al. ................ 370/235 |
| 2013/0176975 A1* | 7/2013 | Turanyi et al. ................ 370/329 |
| 2013/0201832 A1* | 8/2013 | Kang et al. ................... 370/235 |

* cited by examiner

EVOLVED PACKET CORE (EPC) NETWORK FAILURE PREVENTION

RELATED APPLICATION

This application claims priority under 35 U.S.C. §119 based on U.S. Provisional Patent Application No. 61/610,304, filed Mar. 13, 2012, the disclosure of which is incorporated by reference herein in its entirety.

BACKGROUND

In the Third Generation Partnership Project (3GPP), the fourth generation (4G) cellular network includes a radio access network (e.g., referred to as a long term evolution (LTE) network) and a wireless core network (e.g., referred to as evolved packet core (EPC) network). The LTE network is often called an evolved universal terrestrial radio access network (E-UTRAN). The EPC network is an all-Internet protocol (IP) packet-switched core network that supports high-speed wireless and wireline broadband access technologies. The EPC network allows user equipment (UEs) to access various services by connecting to the LTE network, an evolved high rate packet data (eHRPD) radio access network (RAN), and/or a wireless local area network (WLAN) RAN. The EPC network is a complex system that includes a number of network nodes that communicate with each other when UEs are accessing the EPC network. An evolved packet system (EPS) is defined to include both the LTE and EPC networks. EPS seeks to improve mobile technology through higher bandwidth, better spectrum efficiency, wider coverage, enhanced security, and full interworking with other access networks.

A network outage of the EPC network may be catastrophic to a telecommunications provider. For example, if both active and redundant packet data network (PDN) gateways (PGWs) of the EPC network fail, hundreds of thousands of UEs may be disconnected from the EPC network at the same time. Such a situation may create a tsunami-like event where all of the disconnected UEs attempt to reconnect to the EPC network at the same time and create a message surge that eventually overloads a re-authentication and reauthorization device (e.g., a home subscriber server (HSS)) of the EPC network. Authentication is one of the first steps that is performed when UEs are attempting to connect to the EPC network. The connecting UEs send signaling to mobility management entities (MMEs) of the EPC network, and the MMEs, in turn, send the signaling to the HSS for authentication of the UEs. During a message surge, MMEs may be able to sustain the large amount of UEs sending authentication requests at the same time. The HSS, however, may not be able to handle the large amount of authentication requests and may become overloaded. Once the HSS is overloaded, the connecting UEs may not receive service and connected UEs may lose service.

The 4G version of the EPC network may include network nodes that require significantly less space and power requirements than second generation (2G) circuit switched network nodes. The 4G network nodes may be designed to handle millions of UEs while occupying a small amount of space. However, standardization of the 4G version of the EPC network did not consider failure scenarios, such as the example scenario presented above. Thus, the 4G version of the EPC network remains susceptible to catastrophic network failures.

DETAILED DESCRIPTION OF PREFERRED EMBODIMENTS

The following detailed description refers to the accompanying drawings. The same reference numbers in different drawings may identify the same or similar elements.

Systems and/or methods described herein may provide mechanisms to prevent failures in an EPC network. In one example, the systems and/or methods may enable network nodes of the EPC network to share load information and/or capacity information so that traffic may be throttled to or diverted away from congested network nodes. Alternatively, or additionally, the systems and/or methods may enable network nodes of the EPC network to deny connection requests from UEs when the EPC network is approaching failure. Such an arrangement may prevent UEs from attempting to reconnect to the EPC network at the same time.

Figure 1:
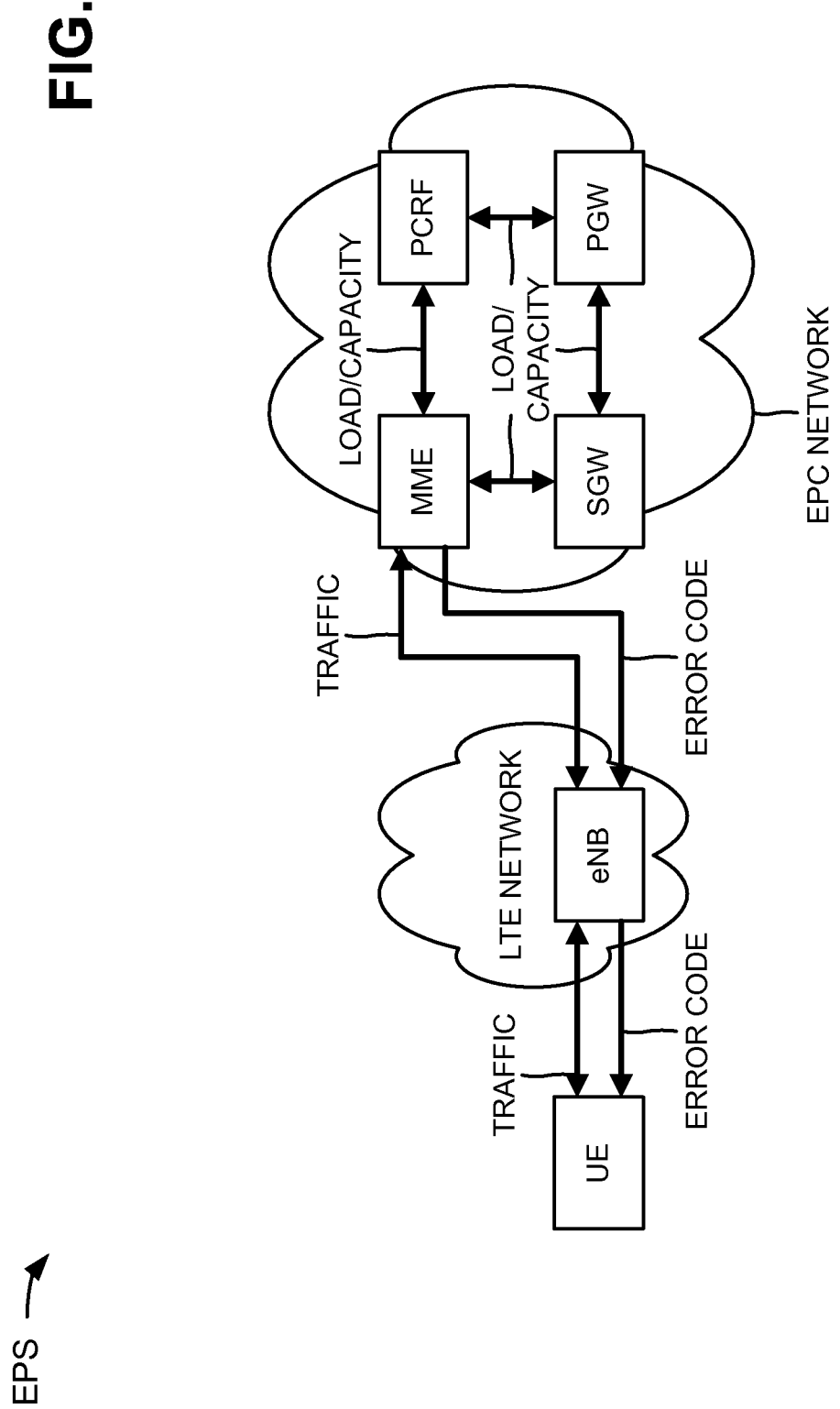
FIG. 1 is a diagram of an overview of an example implementation described herein.

FIG. 1 is a diagram of an overview of an example implementation described herein. As shown in FIG. 1, an EPS may include a UE, a LTE network, and an EPC network. The LTE network may include an eNodeB (eNB). The EPC network may include a variety of network nodes, such as, for example, a MME, a serving gateway (SGW), a policy and charging rule function (PCRF), and a PGW.

The UE may include a radiotelephone, a personal communications system (PCS) terminal, a smart phone, a personal digital assistant (PDA), a laptop computer, a tablet computer, a desktop computer, a workstation computer, a personal computer, a landline telephone, etc. The LTE network may include a communications network that connects subscribers (e.g., the UE) to a service provider. The eNB may enable traffic to be communicated between the UE and the MME and/or the SGW.

The EPC network may include a core network architecture of the 3GPP LTE wireless communication standard. The MME may be responsible for idle mode tracking and paging procedures (e.g., including retransmissions) for the UE. The MME may be involved in a bearer activation/deactivation process (e.g., for the UE) and may choose a SGW for the UE at an initial attach and at a time of intra-LTE handover. The SGW may route and forward traffic, may act as a mobility anchor for a user plane during inter-eNB handovers, and may act as an anchor for mobility between LTE and other 3GPP technologies. The PCRF may provide policy control decision and flow based charging control functionalities. The PGW may provide connectivity of the UE to external packet data networks by being a traffic exit/entry point for the UE.

In one example implementation, the network nodes of the EPC network (e.g., the MME, the SGW, the PCRF, and the PGW) may share load information and/or capacity information with each other. If a particular network node is not connected to another network node, the particular network node may share its load information and/or capacity information via network nodes that may communicate with the particular network node and the other network node. For example, the MME may provide its load information and/or capacity information to the SGW, and the SGW may forward this information to the PGW along with the load information and the capacity information of the SGW. The load information may include a traffic processing capability of a particular network node, such as a maximum amount of transactions that the particular network node can handle. The capacity information may include a current capacity (e.g., in a percentage) of the particular network node.

The EPC network nodes may utilize the load information and/or the capacity information to determine whether to throttle traffic to overloaded or congested network nodes, divert traffic away from the overloaded network nodes, etc. As shown in FIG. 1, the traffic may be provided to and/or received from the UE, via the eNB. For example, if the load information indicates that a particular network node (e.g., the SGW) is approaching a maximum transaction threshold, the other network nodes (e.g., the MME, the PCRF, and the PGW) may throttle traffic to the SGW. Alternatively, or additionally, if the capacity information indicates that a particular network node (e.g., the PGW) is approaching a maximum capacity threshold, the other network nodes (e.g., the MME, the SGW, and the PCRF) may throttle traffic to the PGW. Any network node that is informed of its adjacent network nodes experiencing transaction rate or capacity level challenges may buffer incoming traffic, may create buffer queues for the traffic, and may throttle signaling to the congested network nodes.

If throttling traffic to congested network nodes is unsuccessful, each network node may have the capability to divert traffic to alternate network nodes. For example, the EPC network may include multiple SGWs configured in an active-active configuration, and the MME may divert traffic to an alternate SGW, from a particular SGW that is experiencing an overload situation, in order to alleviate congestion in the particular SGW. If traffic throttling and traffic diversion are unsuccessful, network nodes interfacing with the UE (e.g., the eNB and the MME) may deny connection requests from the UE and other UEs (not shown in FIG. 1), and may provide error codes to the UEs. The error codes may instruct the UEs to not attempt to connect to the EPC network for a particular period of time or until the UEs perform a power cycle.

The term "traffic," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

As used herein, the terms "user" and "subscriber" are intended to be broadly interpreted to include a UE, or a user of a UE.

Figure 2:
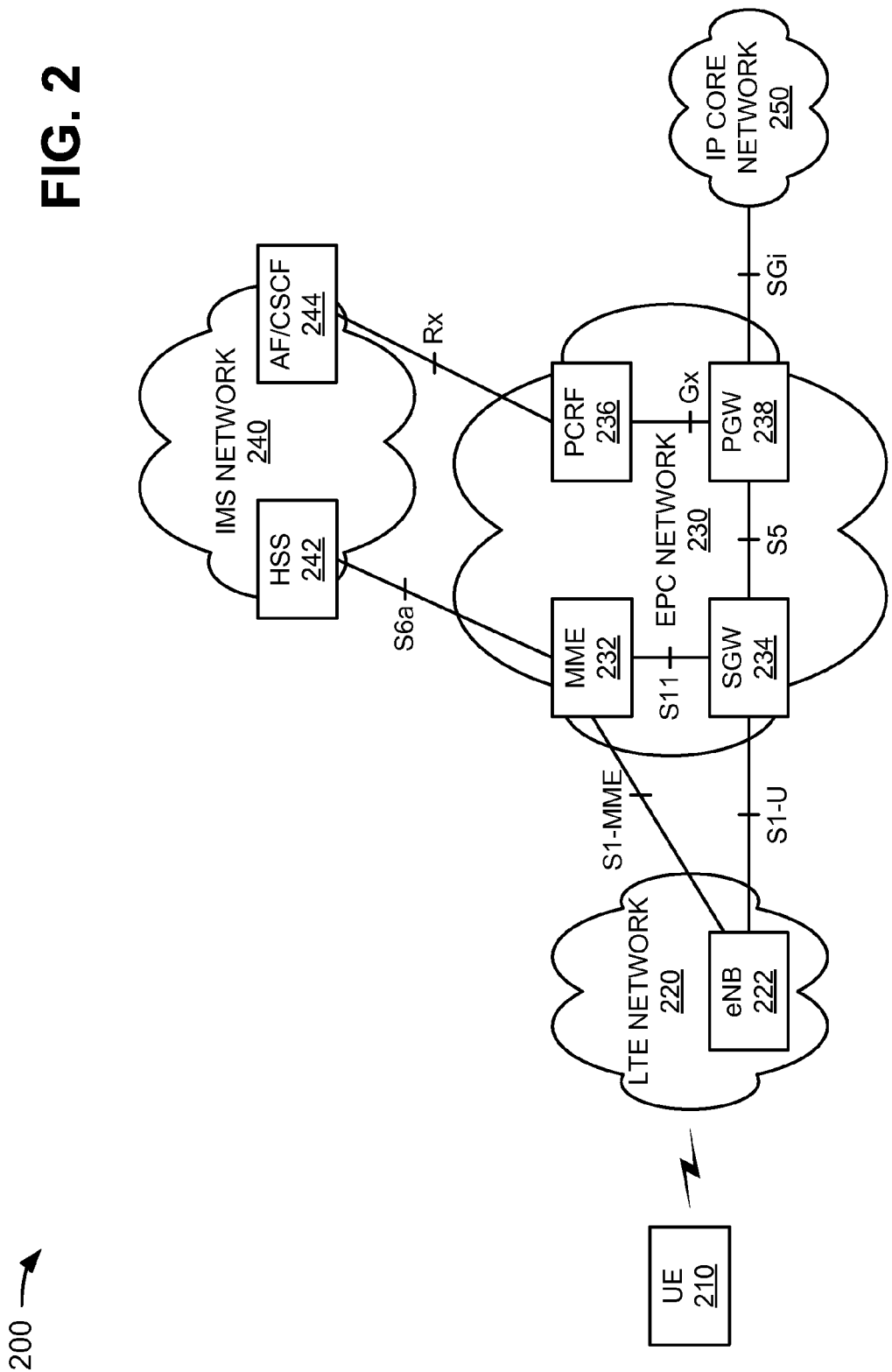
FIG. 2 is a diagram of an example network in which systems and/or methods described herein may be implemented.

FIG. 2 is a diagram of an example network 200 in which systems and/or methods described herein may be implemented. As illustrated, network 200 may include a UE 210, a LTE network 220, an EPC network 230, an IMS network 240, and an IP core network 250. LTE network 220 may include an eNB 222. EPC network 230 may include a MME 232, a SGW 234, a PCRF 236, and a PGW 238. IMS network 240 may include a HSS 242 and an application function/call session control function (AF/CSCF) 144. Devices/networks of network 200 may interconnect via wired and/or wireless connections.

A single UE 210, LTE network 220, eNB 222, EPC network 230, MME 232, SGW 234, PCRF 236, PGW 238, IMS network 240, HSS 242, AF/CSCF 144, and IP core network 250 have been illustrated in FIG. 1 for simplicity. In practice, there may be more UEs 210, LTE networks 220, eNBs 222, EPC networks 230, MMEs 232, SGWs 234, PCRFs 236, PGWs 238, IMS networks 240, HSSs 242, AF/CSCFs 144, and/or IP core networks 250. As further shown in FIG. 1, eNB 222 may interface with MME 232 over a S1-MME interface, and may interface with SGW 234 over a S1-U interface. MME 232 may interface with SGW 234 over a S11 interface, and may interface with HSS 242 over a S6a interface. SGW 234 may interface with PGW 238 over a S5 interface. PCRF 236 may interface with PGW 238 over a Gx interface, and may interface with AF/CSCF 144 over a Rx interface. PGW 238 may interface with IP core network 250 over a SGi interface. Other interfaces not shown in FIG. 2 may also be utilized by EPC network 230. For example, PGW 238 may communicate with an authentication, authorization, and accounting (AAA) server (not shown in FIG. 2) over a S6a interface, and multiple MMEs 232 may interface with one another over S10 interfaces.

UE 210 may include a radiotelephone; a PCS terminal that may combine, for example, a cellular radiotelephone with data processing and data communications capabilities; a smart phone; a PDA that can include a radiotelephone, a pager, Internet/intranet access, etc.; a laptop computer; a tablet computer; a desktop computer; a workstation computer; a personal computer; a landline telephone; or other types of computation and communication devices. In an example implementation, UE 210 may include a device that is capable of communicating over LTE network 220, EPC network 230, IMS network 240, and/or IP core network 250.

LTE network 220 may include a communications network that connects subscribers (e.g., UE 210) to a service provider. In one example, LTE network 220 may include a WiFi network or other access networks (e.g., an E-UTRAN or an enhanced high-rate packet data (eHRPD) network). Alternatively, or additionally, LTE network 220 may include a radio access network capable of supporting high data rate, low latency, packet optimization, large capacity and coverage, etc.

eNB 222 may include one or more computation and communication devices that receive traffic from MME 232 and/or SGW 234 and transmit that traffic to UE 210. eNB 222 may also include one or more devices that receive traffic from UE 210 and transmit that traffic to one of MME 232 and/or SGW 234 or to other UEs 210. eNB 222 may combine the functionalities of a base station and a radio network controller (RNC) in 2G or 3G radio access networks.

EPC network 230 may include a core network architecture of the 3GPP LTE wireless communication standard. In one example, EPC network 230 may include an all-IP packet-switched core network that supports high-speed wireless and wireline broadband access technologies. In another example, EPC network 230 may provide packet-switched voice services (e.g., which are traditionally circuit-switched) using IMS network 240.

MME 232 may include one or more computation and communication devices that may be responsible for idle mode tracking and paging procedures (e.g., including retransmissions) for UE 210. MME 232 may be involved in a bearer activation/deactivation process (e.g., for UE 210) and may choose a SGW for UE 210 at an initial attach and at a time of intra-LTE handover. MME 232 may authenticate UE 210 (e.g., via interaction with HSS 242). Non-access stratum (NAS) signaling may terminate at MME 232 and MME 232 may generate and allocate temporary identities to UEs (e.g., UE 210). MME 232 may check authorization of UE 210 to camp on a service provider's Public Land Mobile Network (PLMN) and may enforce roaming restrictions for UE 210. MME 232 may be a termination point in EPC network 230 for ciphering/integrity protection for NAS signaling and may handle security key management. MME 232 may provide a control plane function for mobility between LTE and access networks with a S3 interface terminating at MME 232. MME 232 may also terminate a S6a interface towards HSS 242 for roaming UEs.

SGW 234 may include one or more traffic transfer devices (or network devices), such as a gateway, a router, a switch, a firewall, a network interface card (NIC), a hub, a bridge, a proxy server, an optical add-drop multiplexer (OADM), or some other type of device that processes and/or transfers traffic. In one example implementation, SGW 234 may route and forward user data packets, may act as a mobility anchor for a user plane during inter-eNB handovers, and may act as an anchor for mobility between LTE and other 3GPP technologies. For idle state UEs, SGW 234 may terminate a downlink (DL) data path and may trigger paging when DL data arrives for UE 210. SGW 234 may manage and store contexts associated with UE 210 (e.g., parameters of an IP bearer service, network internal routing information, etc.).

PCRF 236 may include one or more computation and communication devices that may provide policy control decision and flow based charging control functionalities. PCRF 236 may provide network control regarding service data flow detection, gating, QoS and flow based charging, etc. PCRF 236 may determine how a certain service data flow shall be treated, and may ensure that user plane traffic mapping and treatment is in accordance with a user's subscription profile.

PGW 238 may include one or more traffic transfer devices (or network devices), such as a gateway, a router, a switch, a firewall, a NIC, a hub, a bridge, a proxy server, an OADM, or some other type of device that processes and/or transfers traffic. In one example implementation, PGW 238 may provide connectivity of UE 210 to external packet data networks (e.g., to IP core network 250) by being a traffic exit/entry point for UE 210. UE 210 may simultaneously connect to more than one PGW for accessing multiple PDNs. PGW 238 may perform policy enforcement, packet filtering for each user, charging support, lawful intercept, and packet screening. PGW 238 may also act as an anchor for mobility between 3GPP and non-3GPP technologies.

IMS network 240 may include an architectural framework or network (e.g., a telecommunications network) for delivering IP multimedia services.

HSS 242 may include one or more computation and communication devices that gather, process, search, and/or provide information in a manner described herein. In one example implementation, HSS 242 may include a master user database that supports devices of IMS network 240 that handle calls. HSS 242 may contain subscription-related information (e.g., subscriber profiles), may perform authentication and authorization of a user, and may provide information about a subscriber's location and IP information.

AF/CSCF 144 may include one or more computation and communication devices that gather, process, search, and/or provide information in a manner described herein. In one example implementation, AF/CSCF 144 may interact or intervene with applications that require dynamic policy and charging control. AF/CSCF 144 may extract session information and may provide the session information to PCRF 236 (e.g., over the Rx interface). In one example, AF/CSCF 144 may be a central component for signaling and control within IMS network 240. AF/CSCF 144 may be responsible for signaling via session initiation protocol (SIP) between the transport plane, control plane, and application plane of IMS network 144.

IP core network 250 may include one or more IP-based networks (e.g., a local area network (LAN), a wide area network (WAN), a metropolitan area network (MAN), a telephone network, the Internet, etc.) capable of communicating with UE 210.

Although FIG. 2 shows example devices/networks of network 200, in other implementations, network 200 may contain fewer devices/networks, different devices/networks, differently arranged devices/networks, or additional devices/networks than depicted in FIG. 2. Alternatively, or additionally, one or more devices/networks of network 200 may perform one or more other tasks described as being performed by one or more other devices/networks of network 200.

Figure 3:
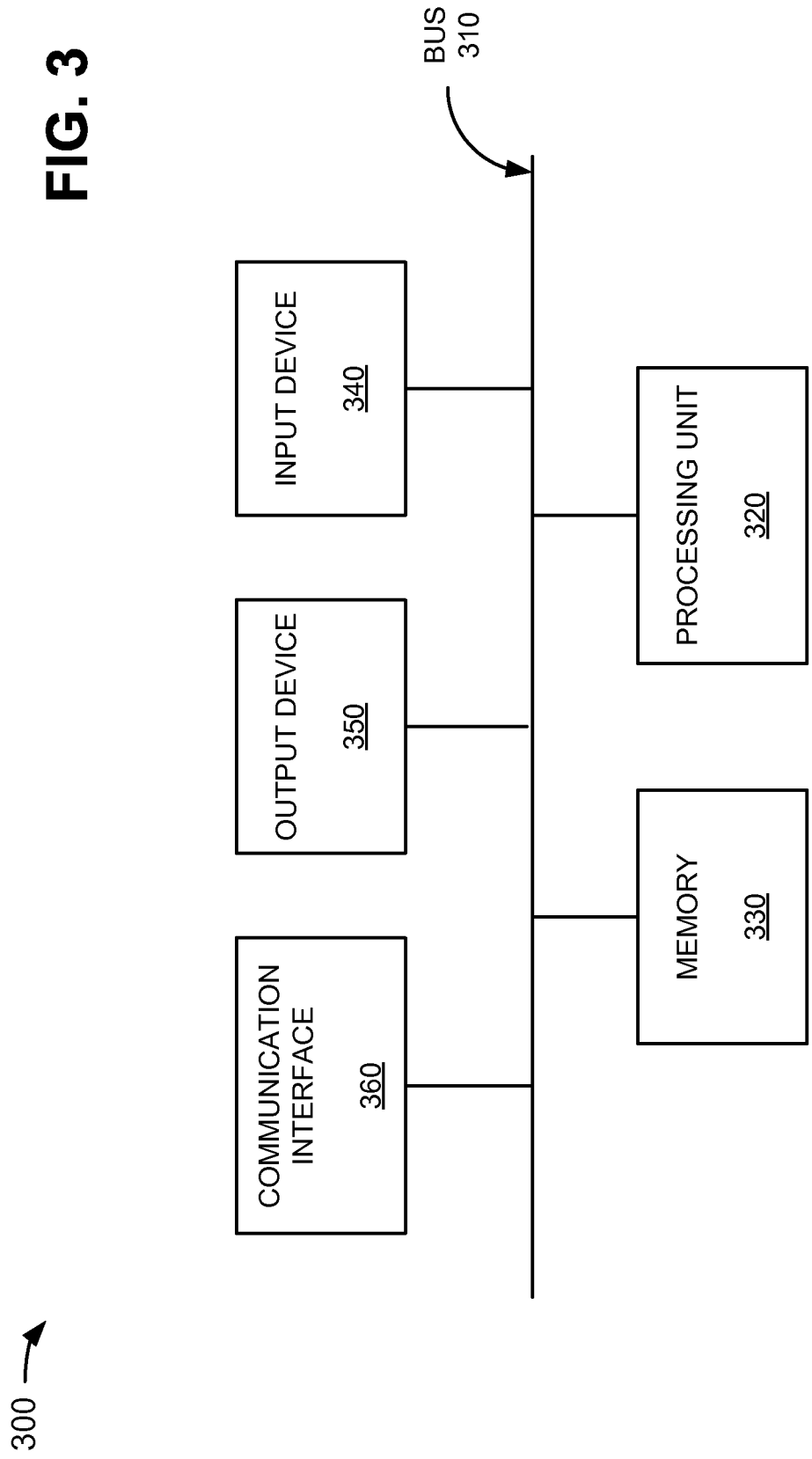
FIG. 3 is a diagram of example components of a device that may correspond to one of the devices of the network depicted in FIG. 2.

FIG. 3 is a diagram of example components of a device 300 that may correspond to one of the devices of network 300. In one example implementation, one or more of the devices of network 200 may include one or more devices 300 or one or more components of device 300. As illustrated in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more ASICs, FPGAs, or the like.

Memory 330 may include a RAM or another type of dynamic storage device that stores information and instructions for execution by processing unit 320, a ROM or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, a touch screen display, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices, such as other devices of network 200.

As described herein, device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more tasks described as being performed by one or more other components of device 300.

Figure 4:
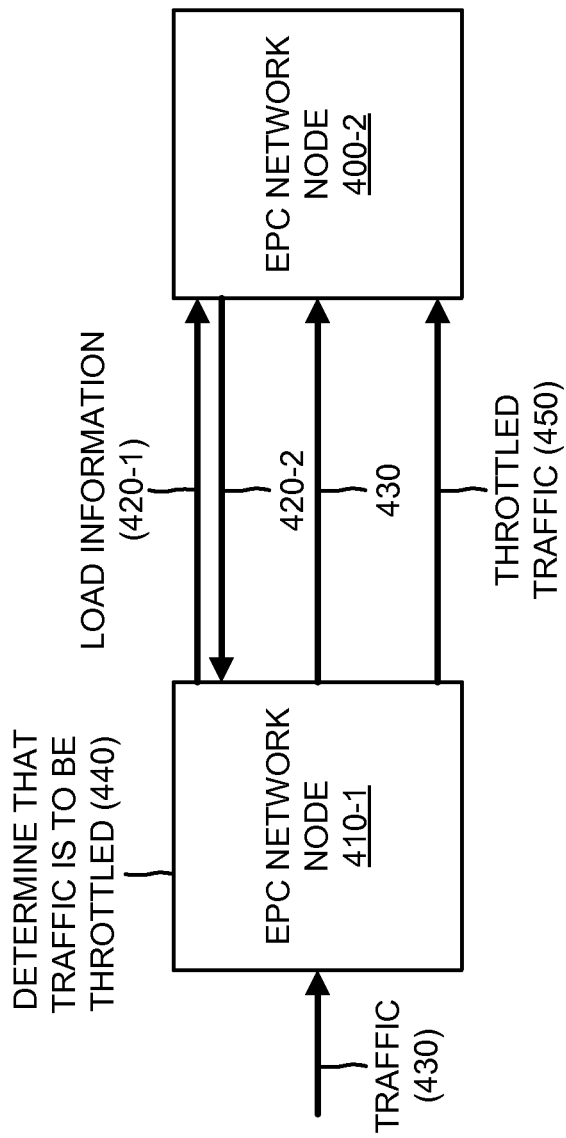
FIG. 4 is a diagram of example interactions among components of an example portion of an EPC network depicted in FIG. 2.

FIG. 4 is a diagram of example interactions among components of an example portion 400 of EPC network 230 (FIG. 2). As shown, example network portion 400 may include a first EPC network node 410-1 and a second EPC network node 410-2. Each of EPC network nodes 410-1/410-2 may correspond to one of MME 232, SGW 234, PCRF 236, or PGW 238 (FIG. 2). MME 232, SGW 234, PCRF 236, and/or PGW 238 may include the features described above in connection with, for example, one or more of FIGS. 1-3.

As further shown in FIG. 4, first EPC network node 410-1 may provide load information 420-1 to second EPC network node 410-2. Second EPC network node 410-2 may provide load information 420-2 to first EPC network node 410-1. Load information 420-1/420-2 may be shared among EPC network nodes 410-1/410-2 via a variety of interfaces, such as, for example, the S1-U, S1-MME, S11, S10, S5, S6a, S6b, Gx, etc. interfaces. Load information 420-1 may include information identifying a traffic processing capability of first EPC network node 410-1, such as a transaction rate capability, a maximum transaction threshold, etc. associated with first EPC network node 410-1. Load information 420-2 may include information identifying a traffic processing capability of second EPC network node 410-2, such as a transaction rate capability, a maximum transaction threshold, etc. associated with second EPC network node 410-2.

First EPC network node 410-1 may receive load information 420-2 and second EPC network node 410-2 may receive load information 420-1. In one example, first EPC network node 410-1 may receive traffic 430 to be provided to second EPC network node 410-2. First EPC network node 410-1 may compare an amount of traffic 430 with load information 420-2 to determine whether the amount of traffic 430 will exceed the maximum transaction threshold associated with second EPC network node 410-2. If the amount of traffic 430 does not exceed the maximum transaction threshold, first EPC network node 410-1 may provide traffic 430 (e.g., in an unthrottled manner) to second EPC network node 410-2. If the amount of traffic 430 exceeds the maximum transaction threshold, first EPC network node 410-1 may determine that traffic 430 is to be throttled, as indicated by reference number 440. Accordingly, first EPC network node 410-1 may throttle traffic 430 to create throttled traffic 450, and may provide throttled traffic 450 to second EPC network node 410-2. In one example, throttled traffic 450 may include traffic 430 that is reduced by an amount to ensure that the maximum transaction threshold of second EPC network node 410-2 is not exceeded.

Although FIG. 4 shows example components of network portion 400, in other implementations, network portion 400 may contain fewer components, different components, differently arranged components, or additional components than depicted in FIG. 4. Alternatively, or additionally, one or more components of network portion 400 may perform one or more other tasks described as being performed by one or more other components of network portion 400.

Figure 5:
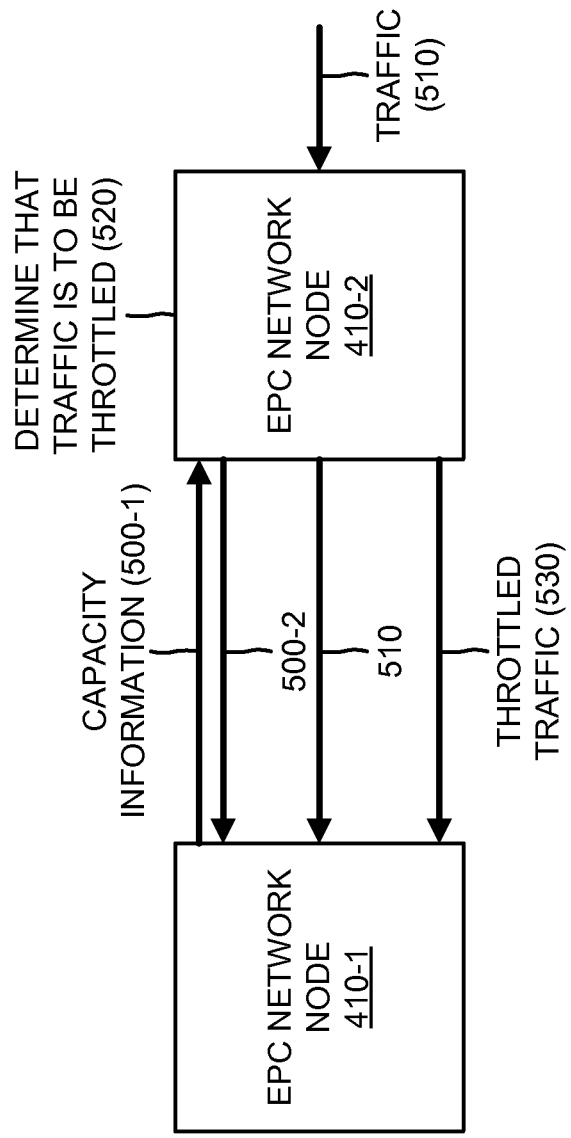
FIG. 5 is a diagram of further example interactions among components of the example EPC network portion depicted in FIG. 4.

FIG. 5 is a diagram of further example interactions among components of example network portion 400 (FIG. 4). As shown, example network portion 400 may include first EPC network node 410-1 and second EPC network node 410-2. First EPC network node 410-1 and second EPC network node 410-2 may include the features described above in connection with, for example, FIG. 4.

As further shown in FIG. 5, first EPC network node 410-1 may provide capacity information 500-1 to second EPC network node 410-2. Second EPC network node 410-2 may provide capacity information 500-2 to first EPC network node 410-1. Capacity information 500-1/500-2 may be shared among EPC network nodes 410-1/410-2 via a variety of interfaces, such as, for example, the S1-U, S1-MME, S11, S10, S5, S6a, S6b, Gx, etc. interfaces. Capacity information 500-1 may include information identifying traffic capacity (e.g., in a percentage) of first EPC network node 410-1, such as a maximum capacity threshold associated with first EPC network node 410-1. Capacity information 500-2 may include information identifying traffic capacity (e.g., in a percentage) of second EPC network node 410-2, such as a maximum capacity threshold associated with second EPC network node 410-2.

First EPC network node 410-1 may receive capacity information 500-2 and second EPC network node 410-2 may receive capacity information 500-1. In one example, second EPC network node 410-2 may receive traffic 510 to be provided to first EPC network node 410-1. Second EPC network node 410-2 may compare an amount of traffic 510 with capacity information 500-1 to determine whether the amount of traffic 510 will exceed the maximum transaction capacity associated with first EPC network node 410-1. If the amount of traffic 510 does not exceed the maximum capacity threshold, second EPC network node 410-2 may provide traffic 510 (e.g., in an unthrottled manner) to first EPC network node 410-1. If the amount of traffic 510 exceeds the maximum capacity threshold, second EPC network node 410-2 may determine that traffic 510 is to be throttled, as indicated by reference number 520. Accordingly, second EPC network node 410-2 may throttle traffic 510 to create throttled traffic 530, and may provide throttled traffic 530 to first EPC network node 410-1. In one implementation, throttled traffic 530 may include traffic 510 that is reduced by an amount to ensure that the maximum capacity threshold of first EPC network node 410-1 is not exceeded. For example, if the capacity of first EPC network node 410-1 reaches 85%, second EPC network node 410-2 may throttle traffic 510 to ensure that the capacity of first EPC network node 410-1 does not exceed 90% or 95%.

Although FIG. 5 shows example components of network portion 400, in other implementations, network portion 400 may contain fewer components, different components, differently arranged components, or additional components than depicted in FIG. 5. Alternatively, or additionally, one or more components of network portion 400 may perform one or more other tasks described as being performed by one or more other components of network portion 400.

Figure 6:
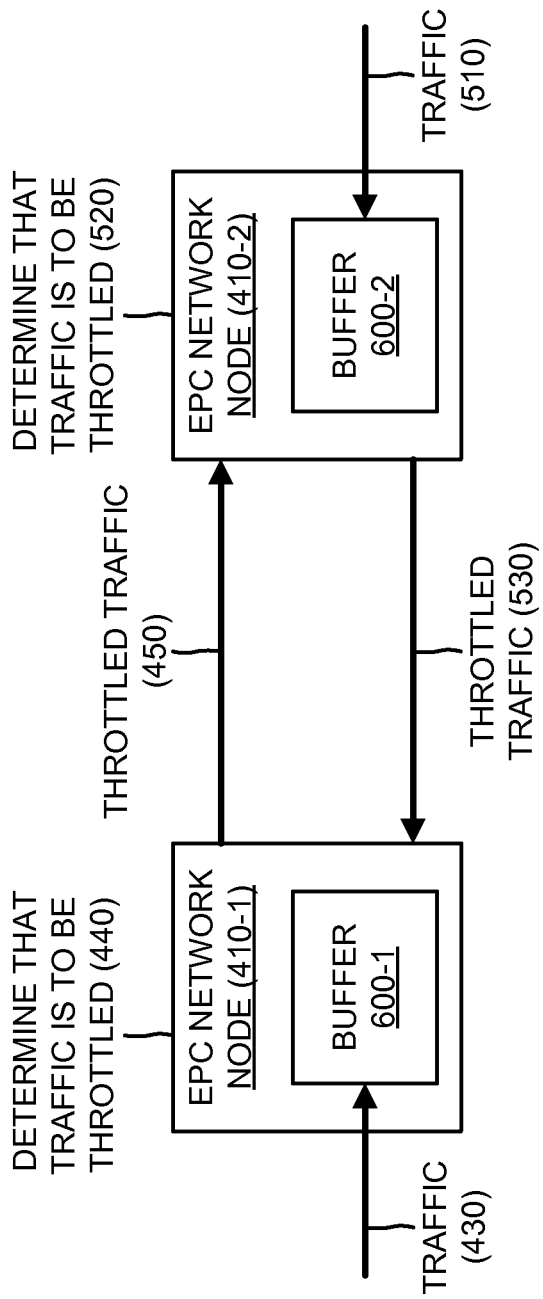
FIG. 6 is a diagram of still further example interactions among components of the example EPC network portion depicted in FIG. 4.

FIG. 6 is a diagram of still further example interactions among components of network portion 400 (FIG. 4). As shown, example network portion 400 may include first EPC network node 410-1 and second EPC network node 410-2. First EPC network node 410-1 and second EPC network node 410-2 may include the features described above in connection with, for example, one or more of FIGS. 4 and 5. As further shown in FIG. 6, first EPC network node 410-1 may include a buffer 600-1 and second EPC network node 410-2 may include a buffer 600-2.

Each of buffers 600-1 and 600-2 may include region of a physical memory (e.g., memory 330, FIG. 3) used to temporarily hold data while the data is being moved from one place to another. Buffers 600-1 and 600-2 may enable first EPC network node 410-1 and second EPC network node 410-2, respectively, to throttle traffic provided to each other. For example, if the amount of traffic 430 exceeds the maximum transaction threshold, first EPC network node 410-1 may determine that traffic 430 is to be throttled, as indicated by reference number 440. First EPC network node 410-1 may receive and temporarily store traffic 430 in buffer 600-1, and may create buffer queues for the temporarily stored traffic 430 in buffer 600-1. The buffer queues may enable first EPC network node 410-1 to control and throttle traffic 430 so that first EPC network node 410-1 may provide throttled traffic 450 to second EPC network node 410-2.

Alternatively, or additionally, if the amount of traffic 510 exceeds the maximum capacity threshold, second EPC network node 410-2 may determine that traffic 510 is to be throttled, as indicated by reference number 520. Second EPC network node 410-2 may receive and temporarily store traffic 510 in buffer 600-2, and may create buffer queues for the temporarily stored traffic 510 in buffer 600-2. The buffer queues may enable second EPC network node 410-2 to control and throttle traffic 510 so that second EPC network node 410-2 may provide throttled traffic 530 to first EPC network node 410-1.

Although FIG. 6 shows example components of network portion 400, in other implementations, network portion 400 may contain fewer components, different components, differently arranged components, or additional components than depicted in FIG. 6. Alternatively, or additionally, one or more components of network portion 400 may perform one or more other tasks described as being performed by one or more other components of network portion 400.

Figure 7:
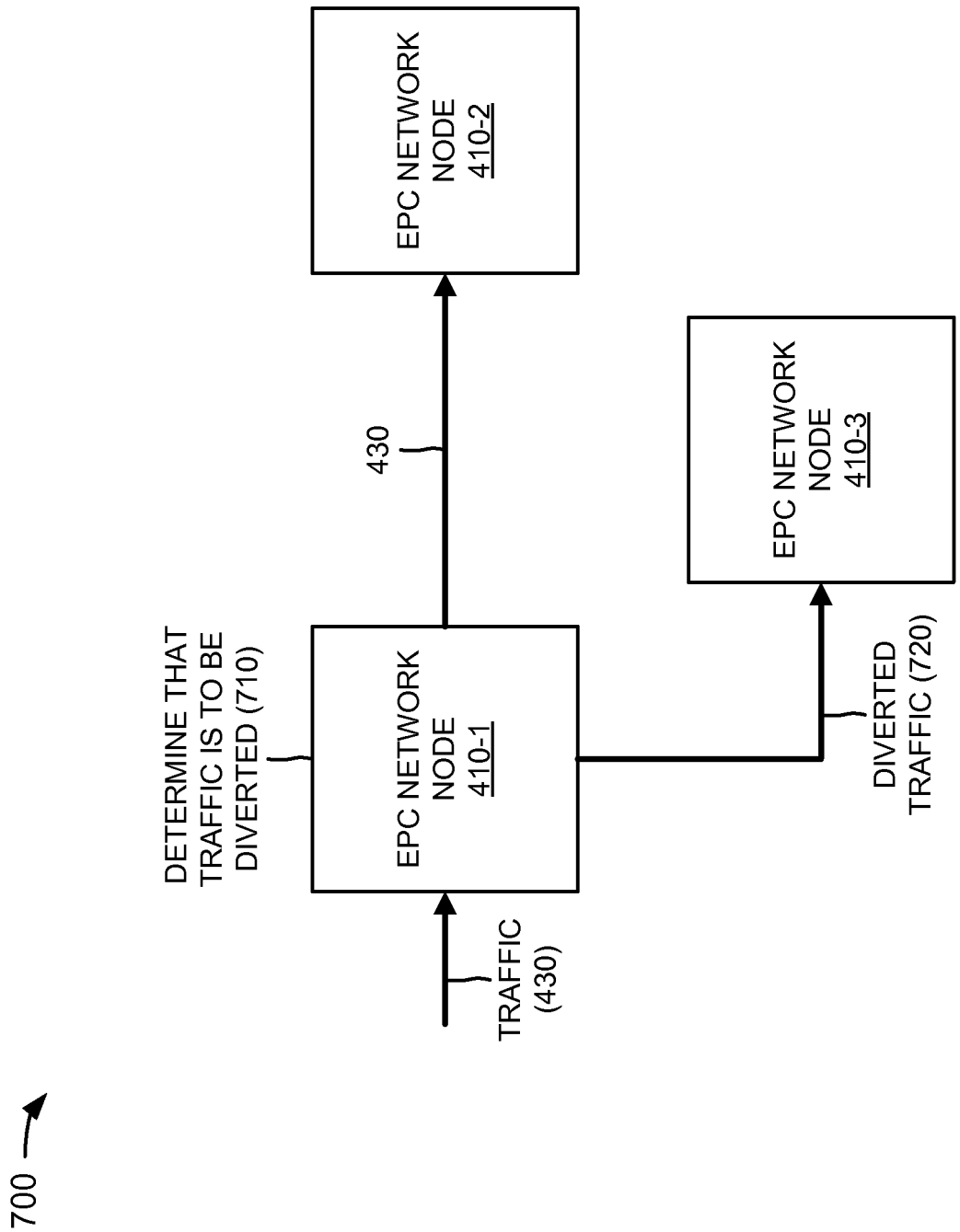
FIG. 7 is a diagram of example interactions among components of another example portion of the EPC network.

FIG. 7 is a diagram of example interactions among components of another example portion 700 of EPC network 230 (FIG. 2). As shown, example network portion 700 may include first EPC network node 410-1, second EPC network node 410-2, and a third EPC network node 410-3. First EPC network node 410-1 and second EPC network node 410-2 may include the features described above in connection with, for example, one or more of FIGS. 4-6. Third EPC network node 410-3 may include the features of first EPC network node 410-1 and/or second EPC network node 410-2.

As further shown in FIG. 7, first EPC network node 410-1 may receive traffic 430 to be provided to second EPC network node 410-2. If first EPC network node 410-1 determines that second EPC network node 410-2 is not overloaded (e.g., based on load information and/or capacity information), first EPC network node 410-1 may provide traffic 430 to second EPC network node 410-2. If first EPC network node 410-1 determines that second EPC network node 410-2 is overloaded (e.g., based on load information and/or capacity information), first EPC network node 410-1 may determine that traffic 430 is to be diverted to alternate network nodes, such as third EPC network node 410-3, as indicated by reference number 710. First EPC network node 410-1 may divert traffic 430 to third EPC network node 410-3, as indicated by reference number 720.

Although FIG. 7 shows example components of network portion 700, in other implementations, network portion 700 may contain fewer components, different components, differently arranged components, or additional components than depicted in FIG. 7. Alternatively, or additionally, one or more components of network portion 700 may perform one or more other tasks described as being performed by one or more other components of network portion 700.

Figure 8:
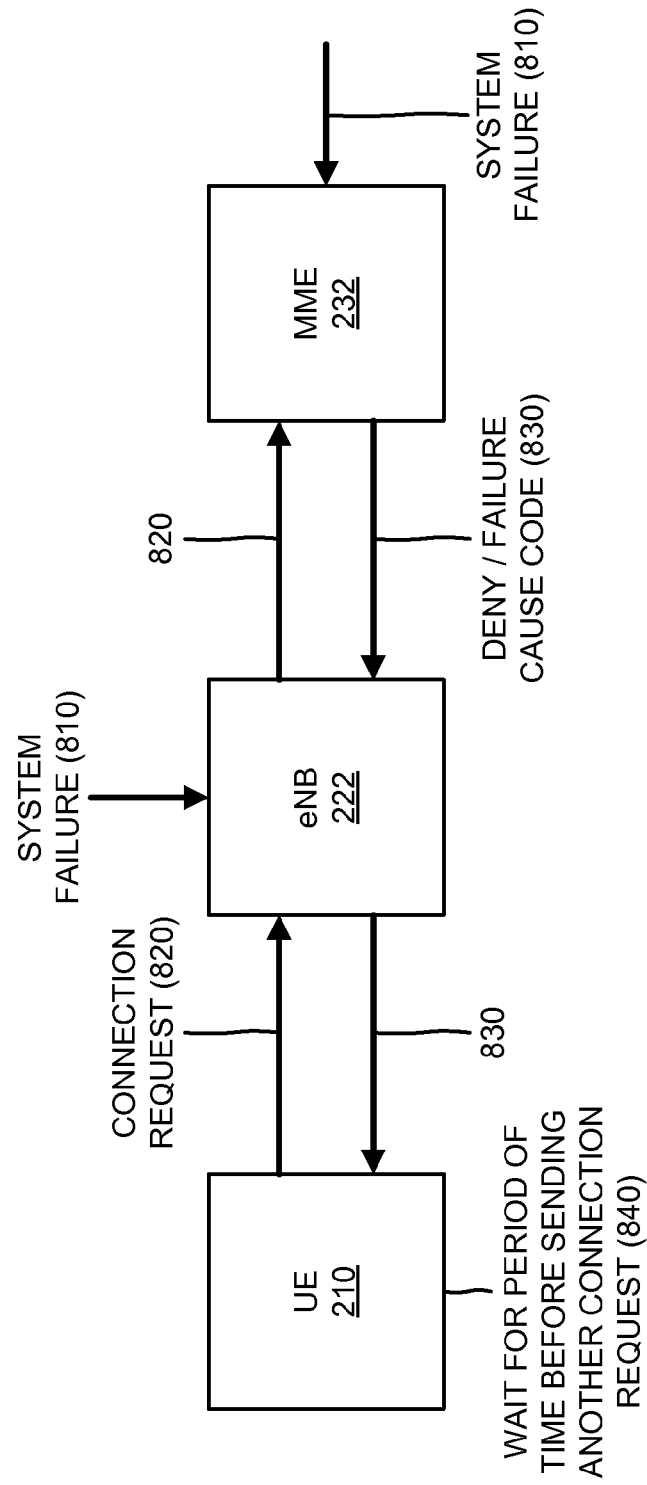
FIG. 8 is a diagram of example interactions among components of an example portion of the network depicted in FIG. 2.

FIG. 8 is a diagram of example interactions among components of an example portion 800 of network 200 (FIG. 2). As shown, example network portion 800 may include UE 210, eNB 222, and MME 232. UE 210, eNB 222, and/or MME 232 may include the features described above in connection with, for example, one or more of FIGS. 1-7.

As further shown in FIG. 8, if traffic throttling and/or traffic diversion are unsuccessful in alleviating congestion in EPC network 230, eNB 222 and/or MME 232 may receive an indication 810 that EPC network 230 may be close to a system failure. If eNB 222 and/or MME 232 receive indication 810 and subsequently receive a connection request 820 from UE 210, eNB 222 and/or MME 232 may provide a message 830 to UE 210 in response to connection request 820. Message 830 may deny connection request 820 of UE 210, and may instruct UE 210 (e.g., via a failure cause code or an error code) to not attempt another connection request 820 until UE 210 performs a power cycle or until a predetermined period of time has expired.

Although FIG. 8 shows example components of network portion 800, in other implementations, network portion 800 may contain fewer components, different components, differently arranged components, or additional components than depicted in FIG. 8. Alternatively, or additionally, one or more components of network portion 800 may perform one or more other tasks described as being performed by one or more other components of network portion 800.

Figure 9:
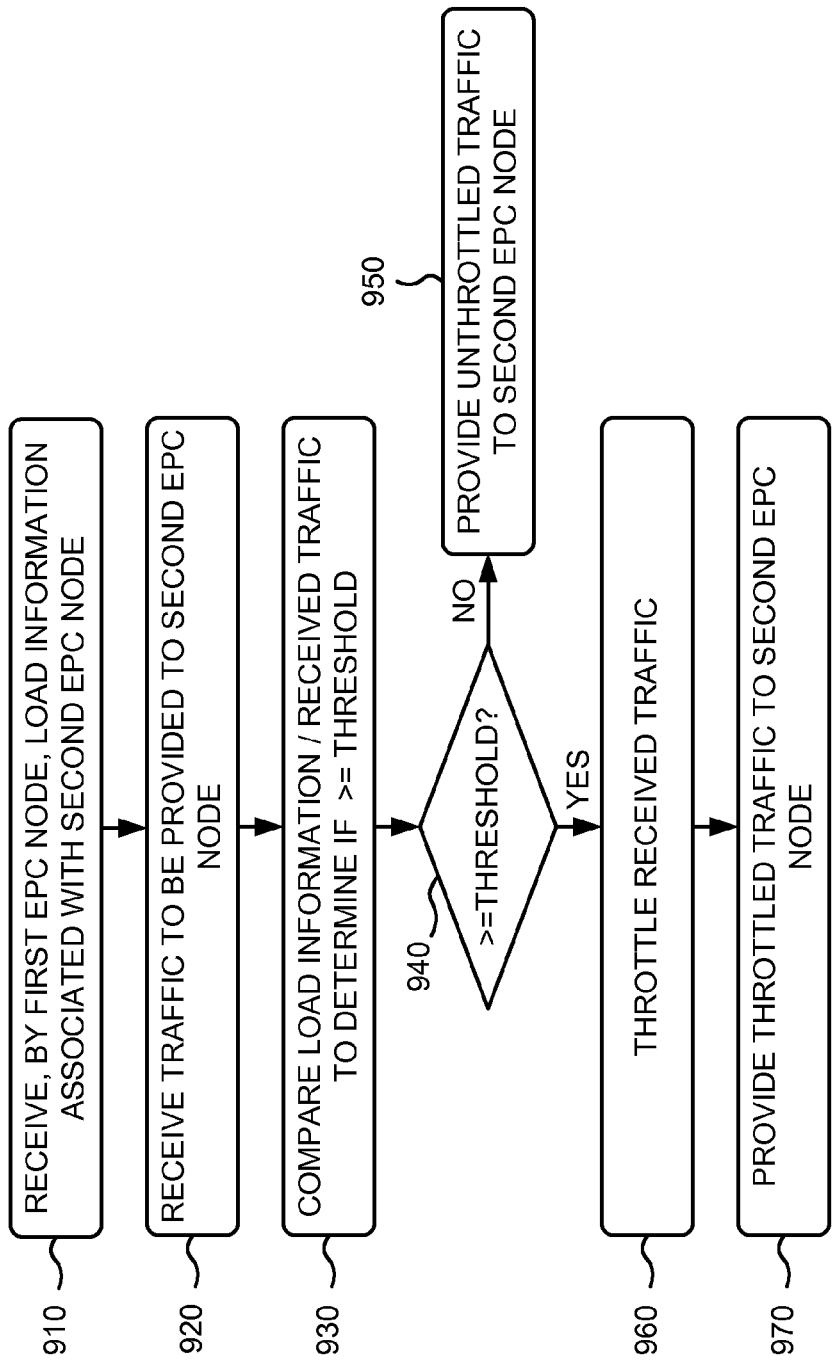
FIG. 9 is a flow chart of an example process for preventing failures in an EPC network according to an implementation described herein.

FIG. 9 is a flow chart of an example process 900 for preventing failures in an EPC network according to an implementation described herein. In one implementation, process 900 may be performed by a network node of EPC network 230. Alternatively, or additionally, some or all of process 900 may be performed by another device or group of devices, including or excluding a network node of EPC network 230.

As shown in FIG. 9, process 900 may include receiving, by a first EPC node, load information associated with a second EPC node (block 910), and receiving traffic to be provided to the second EPC node (block 920). For example, in an implementation described above in connection with FIG. 4, second EPC network node 410-2 may provide load information 420-2 to first EPC network node 410-1. Load information 420-2 may include information identifying a traffic processing capability of second EPC network node 410-2, such as a transaction rate capability, a maximum transaction threshold, etc. associated with second EPC network node 410-2. First EPC network node 410-1 may receive load information 420-2. In one example, first EPC network node 410-1 may receive traffic 430 to be provided to second EPC network node 410-2.

As further shown in FIG. 9, process 900 may include comparing the load information and the received traffic to determine if a threshold is exceeded (block 930). If the threshold is not exceeded (block 940—NO), process 900 may include providing unthrottled traffic to the second EPC node (block 950). For example, in an implementation described above in connection with FIG. 4, first EPC network node 410-1 may compare an amount of traffic 430 with load information 420-2 to determine whether the amount of traffic 430 will exceed the maximum transaction threshold associated with second EPC network node 410-2. If the amount of traffic 430 does not exceed the maximum transaction threshold, first EPC network node 410-1 may provide traffic 430 (e.g., in an unthrottled manner) to second EPC network node 410-2.

Returning to FIG. 9, if the threshold is exceeded (block 940—YES), process 900 may include throttling the received traffic (block 960) and providing the throttled traffic to the second EPC node (block 970). For example, in an implementation described above in connection with FIG. 4, if the amount of traffic 430 exceeds the maximum transaction threshold, first EPC network node 410-1 may determine that traffic 430 is to be throttled, as indicated by reference number 440. Accordingly, first EPC network node 410-1 may throttle traffic 430 to create throttled traffic 450, and may provide throttled traffic 450 to second EPC network node 410-2. In one example, throttled traffic 450 may include traffic 430 that is reduced by an amount to ensure that the maximum transaction threshold of second EPC network node 410-2 is not exceeded.

Figure 10:
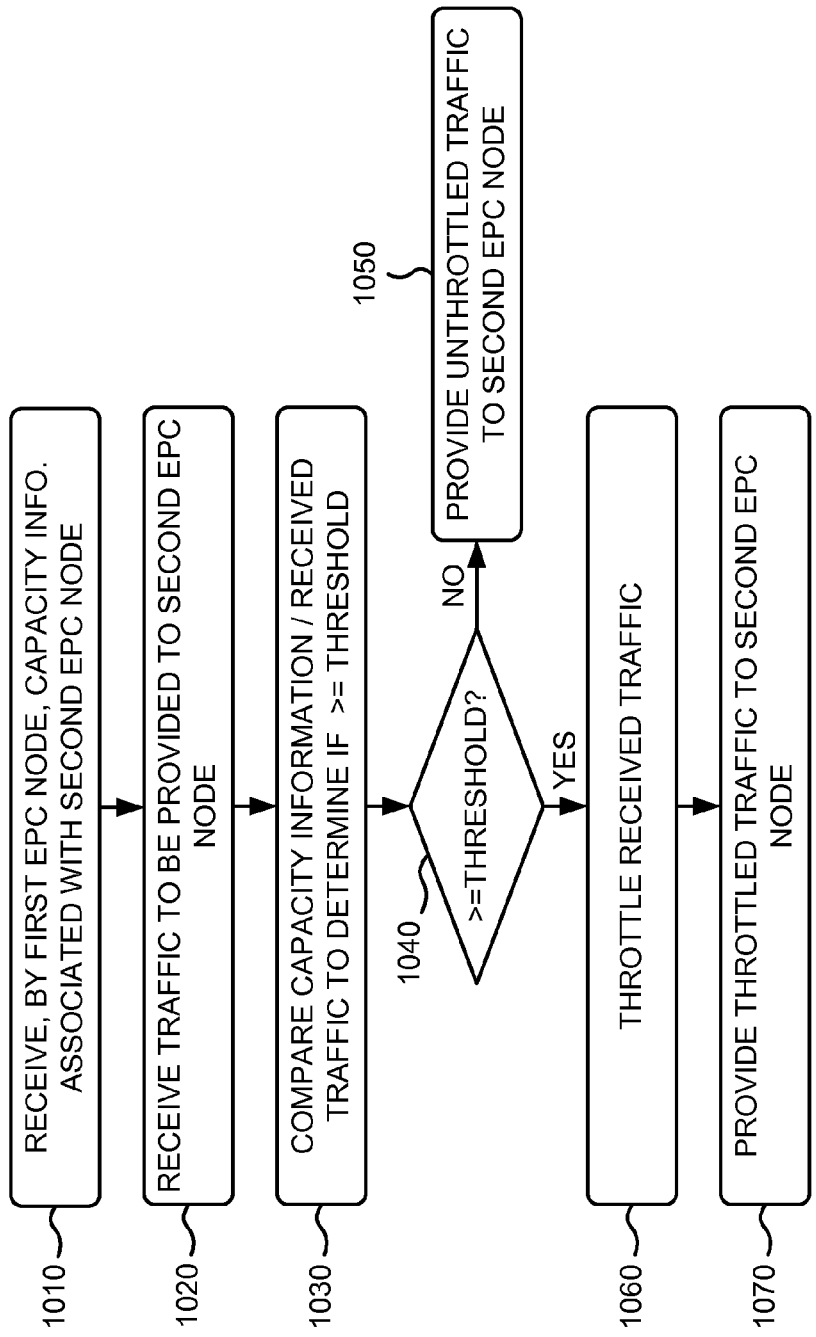
FIGS. 10-12 are flow charts of another example process for preventing failures in an EPC network according to an implementation described herein.
Figure 11:
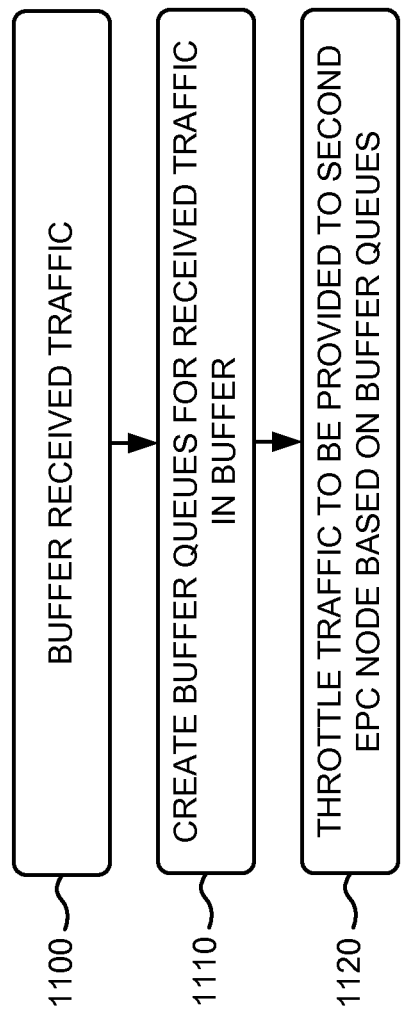
Figure 12:
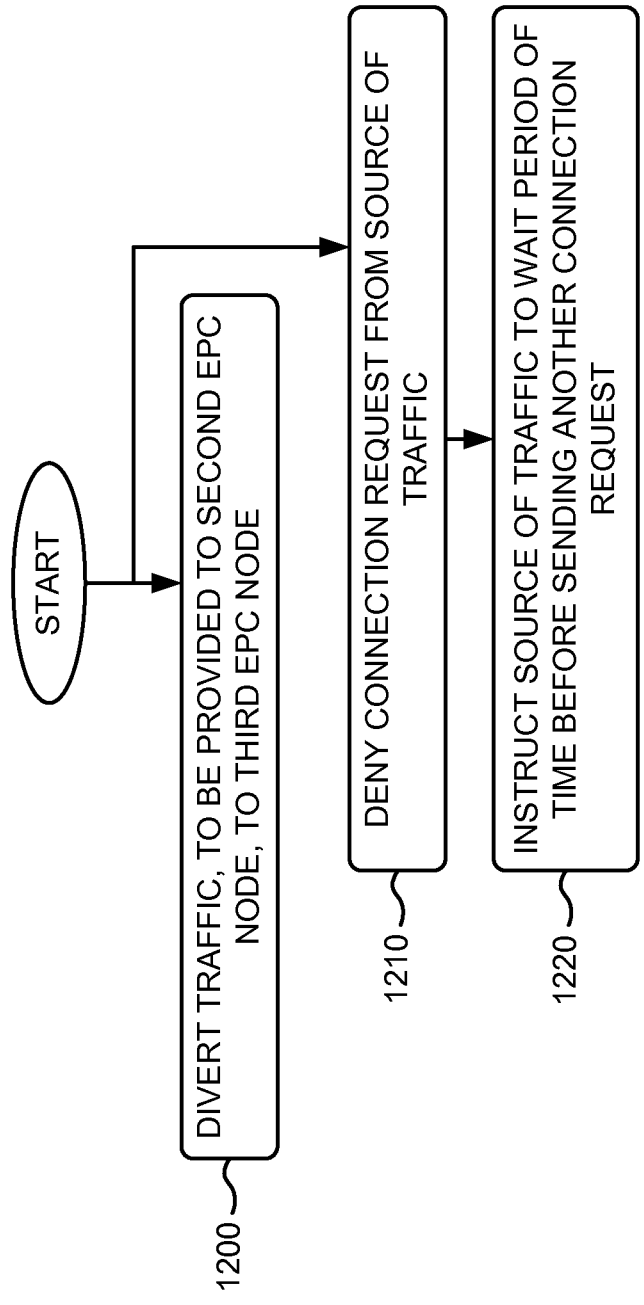

FIGS. 10-12 are flow charts of another example process 1000 for preventing failures in an EPC network according to an implementation described herein. In one implementation, process 1000 may be performed by a network node of EPC network 230. Alternatively, or additionally, some or all of process 1000 may be performed by another device or group of devices, including or excluding a network node of EPC network 230.

As shown in FIG. 10, process 1000 may include receiving, by a first EPC node, capacity information associated with a second EPC node (block 1010), and receiving traffic to be provided to the second EPC node (block 1020). For example, in an implementation described above in connection with FIG. 5, first EPC network node 410-1 may provide capacity information 500-1 to second EPC network node 410-2. Capacity information 500-1 may include information identifying traffic capacity (e.g., in a percentage) of first EPC network node 410-1, such as a maximum capacity threshold associated with first EPC network node 410-1. Second EPC network node 410-2 may receive capacity information 500-1. In one example, second EPC network node 410-2 may receive traffic 510 to be provided to first EPC network node 410-1.

As further shown in FIG. 10, process 1000 may include comparing the capacity information and the received traffic to determine if a threshold is exceeded (block 1030). If the threshold is not exceeded (block 1040—NO), process 1000 may include providing unthrottled traffic to the second EPC node (block 1050). For example, in an implementation described above in connection with FIG. 5, second EPC network node 410-2 may compare an amount of traffic 510 with capacity information 500-1 to determine whether the amount of traffic 510 will exceed the maximum transaction capacity associated with first EPC network node 410-1. If the amount of traffic 510 does not exceed the maximum capacity threshold, second EPC network node 410-2 may provide traffic 510 (e.g., in an unthrottled manner) to first EPC network node 410-1.

Returning to FIG. 10, if the threshold is exceeded (block 1040—YES), process 1000 may include throttling the received traffic (block 1060) and providing the throttled traffic to the second EPC node (block 1070). For example, in an implementation described above in connection with FIG. 5, if the amount of traffic 510 exceeds the maximum capacity threshold, second EPC network node 410-2 may determine that traffic 510 is to be throttled, as indicated by reference number 520. Accordingly, second EPC network node 410-2 may throttle traffic 510 to create throttled traffic 530, and may provide throttled traffic 530 to first EPC network node 410-1. In one example, throttled traffic 530 may include traffic 510 that is reduced by an amount to ensure that the maximum capacity threshold of first EPC network node 410-1 is not exceeded.

Process blocks 960/1060 may include the process blocks depicted in FIG. 11. As shown in FIG. 11, process blocks 960/1060 may include buffering the received traffic (block 1100), creating buffer queues for the received traffic in a buffer (block 1110), and throttling the traffic to be provided to the second EPC node based on the buffer queues (block 1120). For example, in an implementation described above in connection with FIG. 6, first EPC network node 410-1 may include buffer 600-1 that may enable first EPC network node 410-1 to throttle traffic provided to second EPC network node 410-2. If the amount of traffic 430 exceeds the maximum transaction threshold, first EPC network node 410-1 may determine that traffic 430 is to be throttled, as indicated by reference number 440. First EPC network node 410-1 may receive and temporarily store traffic 430 in buffer 600-1, and may create buffer queues for the temporarily stored traffic 430 in buffer 600-1. The buffer queues may enable first EPC network node 410-1 to control and throttle traffic 430 so that first EPC network node 410-1 may provide throttled traffic 450 to second EPC network node 410-2.

Alternatively, or additionally, process blocks 960/1060 may include the process blocks depicted in FIG. 12. As shown in FIG. 12, process blocks 960/1060 may include diverting the traffic, to be provided to the second EPC node, to a third EPC node (block 1200). For example, in an implementation described above in connection with FIG. 7, if first EPC network node 410-1 determines that second EPC network node 410-2 is overloaded (e.g., based on load information and/or capacity information), first EPC network node 410-1 may determine that traffic 430 is to be diverted to alternate network nodes, such as third EPC network node 410-3, as indicated by reference number 710. First EPC network node 410-1 may divert traffic 430 to third EPC network node 410-3, as indicated by reference number 720.

As further shown in FIG. 12, process blocks 960/1060 may include denying a connection request from a source of the traffic (block 1210), and instructing the source of the traffic to wait a period of time before sending another connection request (block 1220). For example, in an implementation described above in connection with FIG. 8, if eNB 222 and/or MME 232 receive connection request 820 from UE 210, eNB 222 and/or MME 232 may provide message 830 to UE 210 in response to connection request 820. Message 830 may deny connection request 820 of UE 210, and may instruct UE 210 (e.g., via a failure cause code or an error code) to not attempt another connection request 820 until UE 210 performs a power cycle or until a predetermined period of time has expired.

Systems and/or methods described herein may provide mechanisms to prevent failures in an EPC network. In one example, the systems and/or methods may enable network nodes of the EPC network to share load information and/or capacity information so that traffic may be throttled to or diverted away from congested network nodes. Alternatively, or additionally, the systems and/or methods may enable network nodes of the EPC network to deny connection requests from UEs when the EPC network is approaching failure. Such an arrangement may prevent UEs from attempting to reconnect to the EPC network at the same time.

The foregoing description of implementations provides illustration and description, but is not intended to be exhaustive or to limit the implementations to the precise form disclosed. Modifications and variations are possible in light of the above disclosure or may be acquired from practice of the implementations.

For example, while series of blocks have been described with regard to FIGS. 9-12, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a first node device provided in an evolved packet core network, load information associated with a second node device provided in the evolved packet core network, the load information including a load threshold associated with the second node device;
   receiving, by the first node device, traffic to be provided to the second node device;
   determining, by the first node device, whether providing the traffic to the second node device will cause the second node device to exceed the load threshold;
   providing, by the first node device, the traffic to the second node device when providing the traffic to the second node device will not cause the second node device to exceed the load threshold;
   reducing, by the first node device, a quantity associated with the traffic, to create throttled traffic, when providing the traffic to the second node device will cause the second node device to exceed the load threshold,
   wherein reducing the quantity associated with the traffic, to create the throttled traffic, comprises buffering the traffic in a buffer of the first node device and creating buffer queues for the traffic in the buffer; or
   wherein reducing the quantity associated with the traffic, to create the throttled traffic, comprises denying a connection request from a source of the traffic, when providing the traffic to the second node device will cause the second node device to exceed the load threshold;
   receiving, by the first node device, capacity information associated with the second node device, the capacity information including a capacity threshold associated with the second node device;
   determining whether providing the traffic to the second node device will cause the second node device to exceed the capacity threshold;
   providing the traffic to the second node device when providing the traffic to the second node device will not cause the second node device to exceed the capacity threshold; and
   providing, by the first node device, the throttled traffic to the second node device, when providing the traffic to the second node device will cause the second node device to exceed the load threshold.

2. The method of claim 1, further comprising:
   reducing a quantity associated with the traffic, to create the throttled traffic, when providing the traffic to the second node device will cause the second node device to exceed the capacity threshold; and
   providing the throttled traffic to the second node device, when providing the traffic to the second node device will cause the second node device to exceed the capacity threshold.

3. The method of claim 2, where reducing the quantity associated with the traffic, to create the throttled traffic, when providing the traffic to the second node device will cause the second node device to exceed the load threshold or the capacity threshold, further comprises:
   reducing the quantity of the traffic based on the created buffer queues.

4. The method of claim 2, further comprising:
   diverting the traffic to a third node device provided in the evolved packet core network, when providing the traffic to the second node device will cause the second node device to exceed the load threshold or the capacity threshold.

5. The method of claim 2, further comprising:
   denying a connection request from a source of the traffic, when providing the traffic to the second node device will cause the second node device to exceed the capacity threshold; and
   instructing the source of the traffic to wait a period of time before sending another connection request.

6. The method of claim 1, where the first node device includes one of:
   a mobility management entity (MME),
   a serving gateway (SGW),
   a packet data network (PDN) gateway (PGW), or
   a policy and charging rule function (PCRF).

7. The method of claim 6, where the second node device includes one of:
   a mobility management entity (MME), a serving gateway (SGW), a packet data network (PDN) gateway (PGW), or a policy and charging rule function (PCRF).

8. A first node device provided in an evolved packet core network, the first node device comprising:
   a processor to:
     receive load information associated with a second node device provided in the evolved packet core network, wherein the load information includes a load threshold associated with the second node device,
     receive traffic to be provided to the second node device, determine whether providing the traffic to the second node device will cause the second node device to exceed the load threshold,
provide the traffic to the second node device when providing the traffic to the second node device will not cause the second node device to exceed the load threshold,
reduce a quantity associated with the traffic, to create throttled traffic, when providing the traffic to the second node device will cause the second node device to exceed the load threshold,
wherein, when reducing the quantity of associated with the traffic, the processor is further to buffer the traffic in a buffer of the first node device, or
wherein reducing the quantity associated with the traffic, to create throttled traffic, comprises denying a connection request from a source of the traffic, when providing the traffic to the second node device will cause the second node device to exceed the load threshold,
receive capacity information associated with the second node device, wherein the capacity information includes a capacity threshold associated with the second node device,
determine whether providing the traffic to the second node device will cause the second node device to exceed the capacity threshold,
provide the traffic to the second node device when providing the traffic to the second node device will not cause the second node device to exceed the capacity threshold, and
provide the throttled traffic to the second node device, when providing the traffic to the second node device will cause the second node device to exceed the load threshold.

9. The first node device of claim 8, where the load information includes information identifying a traffic processing capability of the second node device.

10. The first node device of claim 8, where the processor is further to:
reduce a quantity associated with the traffic, to create the throttled traffic, when providing the traffic to the second node device will cause the second node device to exceed the capacity threshold, and
provide the throttled traffic to the second node device, when providing the traffic to the second node device will cause the second node device to exceed the capacity threshold.

11. The first node device of claim 10, where the capacity information includes information identifying traffic capacity of the second node device.

12. The first node device of claim 10, where, when reducing the quantity associated with the traffic, the processor is further to:
reduce the quantity of the traffic based on the created buffer queues.

13. The first node device of claim 10, wherein the processor is further to:
divert the traffic to a third node device provided in the evolved packet core network, when providing the traffic to the second node device will cause the second node device to exceed the load threshold or the capacity threshold.

14. The first node device of claim 10, wherein the processor is further to:
deny a connection request from a source of the traffic, when providing the traffic to the second node device will cause the second node device to exceed the capacity threshold, and
instruct the source of the traffic to wait a period of time before sending another connection request.

15. The first node device of claim 8, where the first node device includes one of:
a mobility management entity (MME),
a serving gateway (SGW),
a packet data network (PDN) gateway (PGW), or
a policy and charging rule function (PCRF).

16. The first node device of claim 15, where the second node device includes one of:
a mobility management entity (MME),
a serving gateway (SGW),
a packet data network (PDN) gateway (PGW), or
a policy and charging rule function (PCRF).

17. A non-transitory computer-readable medium, comprising:
one or more instructions that, when executed by one or more processors of a first node device provided in an evolved packet core network, cause the one or more processors to:
receive load information or capacity information associated with a second node device provided in the evolved packet core network, wherein:
the load information includes a load threshold associated with the second node device, and
the capacity information includes a capacity threshold associated with the second node device,
receive traffic to be provided to the second node device,
determine whether providing the traffic to the second node device will cause the second node device to exceed the load threshold,
provide the traffic to the second node device when providing the traffic to the second node device will not cause the second node device to exceed the load threshold and the capacity threshold,
reduce a quantity associated with the traffic, to create throttled traffic, when providing the traffic to the second node device will cause the second node device to exceed the load threshold or the capacity threshold, wherein reducing the quantity associated with the traffic causes the one or more processors to buffer the traffic in a buffer of the first node device and create buffer queues for the traffic in the buffer,
deny a connection request from a source of the traffic, when providing the traffic to the second node device will cause the second node device to exceed the load threshold or the capacity threshold,
instruct the source of the traffic to wait a period of time before sending another connection request, and
provide the throttled traffic to the second node device, when providing the traffic to the second node device will cause the second node device to exceed the load threshold or the capacity threshold.

18. The non-transitory computer-readable medium of claim 17, where the load information includes information identifying a traffic processing capability of the second node device.

19. The non-transitory computer-readable medium of claim 17, where the capacity information includes information identifying traffic capacity of the second node device.

20. The non-transitory computer-readable medium of claim 17, further comprising:

one or more instructions that, when executed by the one or more processors of the first node device, cause the one or more processors to:
reduce the quantity of the traffic based on the created buffer queues.

21. The non-transitory computer-readable medium of claim 17, further comprising:
one or more instructions that, when executed by the one or more processors of the first node device, cause the one or more processors to:
divert the traffic to a third node device provided in the evolved packet core network, when providing the traffic to the second node device will cause the second node device to exceed the load threshold or the capacity threshold.

22. The non-transitory computer-readable medium of claim 17, where the first node device includes one of:
a mobility management entity (MME),
a serving gateway (SGW),
a packet data network (PDN) gateway (PGW), or
a policy and charging rule function (PCRF).

23. The non-transitory computer-readable medium of claim 22, where the second node device includes one of:
a mobility management entity (MME),
a serving gateway (SGW),
a packet data network (PDN) gateway (PGW), or
a policy and charging rule function (PCRF).

* * * * *